(12) United States Patent
Jurkuvenas et al.

(10) Patent No.: US 10,311,712 B2
(45) Date of Patent: Jun. 4, 2019

(54) APPARATUS AND METHODS FOR CONTROLLING FUNCTIONALITY AND SUPPLYING POWER TO A PERIPHERAL DEVICE ATTACHED TO AN ITEM OF CLOTHING

(71) Applicant: Wearable Technology Limited, Enderby, Leicester (GB)

(72) Inventors: Mantas Jurkuvenas, Stockport (GB); Michael John Lynch, Earl Shilton (GB)

(73) Assignee: Wearable Technology Limited, Enderby, Leicester (GB)

( * ) Notice: Subject to any disclaimer, the term of this patent is extended or adjusted under 35 U.S.C. 154(b) by 0 days.

(21) Appl. No.: 15/697,155

(22) Filed: Sep. 6, 2017

(65) Prior Publication Data
US 2018/0075734 A1    Mar. 15, 2018

(30) Foreign Application Priority Data

Sep. 10, 2016   (GB) .................................. 1615418.9
Sep. 10, 2016   (GB) .................................. 1615420.5

(51) Int. Cl.
*A41D 1/00*    (2018.01)
*A41D 27/20*   (2006.01)
(Continued)

(52) U.S. Cl.
CPC ............ *G08B 29/181* (2013.01); *A41D 1/005* (2013.01); *A41D 27/205* (2013.01); *F21V 5/04* (2013.01);
(Continued)

(58) Field of Classification Search
CPC .......... A41D 1/002; A41D 1/005; A41D 3/00; A41D 13/01; F21V 5/04; F21V 33/0008; F21Y 2115/10; G06F 1/1632; G06F 1/26; G06F 1/266; G08B 5/36; G08B 29/181; G09G 5/006; H02J 4/00; H02J 7/0004; H02J 7/0042; H02J 7/025; H02J 7/0027; H02J 50/10; H04B 1/385; H04B 7/26; H04Q 9/00; H04Q 2209/88; H05B 33/0845; H05B 37/0272
(Continued)

(56) References Cited

U.S. PATENT DOCUMENTS 4,617,561 A * 10/1986 Brown ................. G08B 17/113
                                                       200/60
4,651,010 A *  3/1987 Javan .................. G01N 21/643
                                                       250/458.1
(Continued)

FOREIGN PATENT DOCUMENTS

DE    102004039765 A1    3/2006
JP        3007334 B1    11/1999
(Continued)

*Primary Examiner* — Quan-Zhen Wang
*Assistant Examiner* — Stephen R Burgdorf
(74) *Attorney, Agent, or Firm* — Richard M. Goldberg

(57) ABSTRACT

An item of clothing (105) operates with a peripheral device (107). The item of clothing includes a first power source and is configured to supply power to the peripheral device, via a connector (305). The peripheral device includes a second power source and is configured to selectively use power from the first power source or the second power source.

10 Claims, 16 Drawing Sheets

(51) Int. Cl.
  *F21V 5/04* (2006.01)
  *F21V 33/00* (2006.01)
  *G08B 21/04* (2006.01)
  *G08B 25/10* (2006.01)
  *G08B 29/18* (2006.01)
  *H04B 1/3827* (2015.01)
  *H04Q 9/00* (2006.01)
  *H05B 33/08* (2006.01)
  *H05B 37/02* (2006.01)
  *A41D 3/00* (2006.01)
  *G08B 5/36* (2006.01)
  *H04B 7/26* (2006.01)
  *G08B 21/02* (2006.01)
  *G08B 21/14* (2006.01)
  *F21Y 115/10* (2016.01)

(52) U.S. Cl.
  CPC ...... *F21V 33/0008* (2013.01); *G08B 21/0453* (2013.01); *G08B 25/10* (2013.01); *H04B 1/385* (2013.01); *H04Q 9/00* (2013.01); *H05B 33/0845* (2013.01); *H05B 37/0272* (2013.01); *A41D 3/00* (2013.01); *F21Y 2115/10* (2016.08); *G08B 5/36* (2013.01); *G08B 21/0288* (2013.01); *G08B 21/0476* (2013.01); *G08B 21/14* (2013.01); *H04B 7/26* (2013.01); *H04Q 2209/88* (2013.01)

(58) Field of Classification Search
  USPC ........................................................ 430/509
  See application file for complete search history.

(56) References Cited

U.S. PATENT DOCUMENTS

| | | | |
|---|---|---|---|
| 4,827,534 A | 5/1989 | Haugen | |
| 5,893,629 A * | 4/1999 | Gubernick | F21L 15/02 362/186 |
| 7,878,668 B2 * | 2/2011 | Martinez | F21L 4/08 362/147 |
| 9,819,850 B2 * | 11/2017 | Taran Katz | H01R 25/00 |
| 2002/0076949 A1 * | 6/2002 | Tilbury | H05B 3/342 439/37 |
| 2002/0084901 A1 | 7/2002 | Mantyjarvi et al. | |
| 2003/0056969 A1 * | 3/2003 | Eves | H01B 7/0009 174/68.1 |
| 2004/0057578 A1 * | 3/2004 | Brewer | G04G 21/04 379/433.1 |
| 2004/0209153 A1 * | 10/2004 | Peled | H01M 4/8605 429/414 |
| 2005/0181839 A1 * | 8/2005 | Tiainen | H02J 3/42 455/573 |
| 2006/0023069 A1 * | 2/2006 | Saito | H04N 5/23293 348/207.99 |
| 2008/0026354 A1 * | 1/2008 | Marmaropoulos | G09B 23/182 434/301 |
| 2009/0102416 A1 | 4/2009 | Burley | |
| 2009/0218884 A1 | 9/2009 | Soar | |
| 2011/0016333 A1 * | 1/2011 | Scott | G06F 1/266 713/300 |
| 2012/0173770 A1 * | 7/2012 | Walker | G06F 3/038 710/15 |
| 2014/0015470 A1 | 1/2014 | Lim et al. | |
| 2014/0285134 A1 | 9/2014 | Kim et al. | |
| 2014/0285355 A1 * | 9/2014 | Matte | G08B 5/36 340/815.45 |
| 2014/0318699 A1 | 10/2014 | Longinotti-Buitoni et al. | |
| 2016/0134153 A1 | 5/2016 | Miller et al. | |
| 2016/0181823 A1 | 6/2016 | Durham et al. | |
| 2016/0248265 A1 | 8/2016 | Oo et al. | |
| 2018/0014172 A1 * | 1/2018 | Baldree | H04W 4/90 |

FOREIGN PATENT DOCUMENTS

| | | |
|---|---|---|
| WO | 01/97560 A2 | 12/2001 |
| WO | 01/97567 A1 | 12/2001 |
| WO | 2010/015856 A2 | 2/2010 |

\* cited by examiner

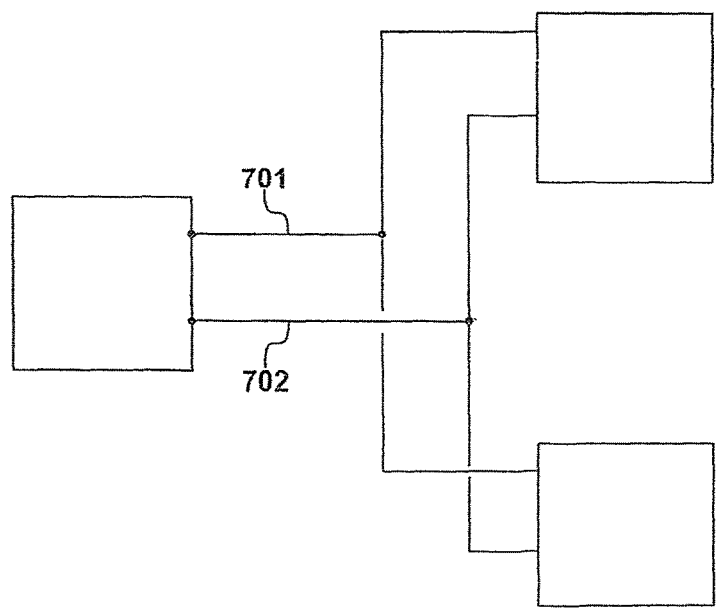
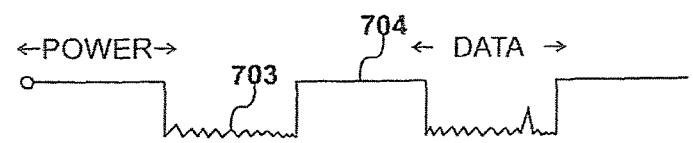
*Fig. 7*

US 10,311,712 B2

APPARATUS AND METHODS FOR CONTROLLING FUNCTIONALITY AND SUPPLYING POWER TO A PERIPHERAL DEVICE ATTACHED TO AN ITEM OF CLOTHING

CROSS REFERENCE TO RELATED APPLICATIONS

This application claims priority from United Kingdom patent application number 1615418.9 filed Sep. 10, 2016 and United Kingdom patent application 1615420.5, the entire disclosure of which are incorporated herein by reference in their entirety.

BACKGROUND OF THE INVENTION

The present invention relates to the powering of peripheral devices, used in combination with clothing that includes a power source.

It is known to provide items of clothing with peripheral devices. In most known applications of this sort, each peripheral device contains its own power supply which may take the form of replaceable batteries or rechargeable batteries. Users are then responsible for ensuring that peripheral devices are appropriately charged prior to their deployment.

An alternative approach to providing each device with its own power source is to provide power from a central source via power distribution cables. A problem with this approach is that the degree of power that may be conveyed in this way is often limited, particularly if the devices are to be detachable.

BRIEF SUMMARY OF THE INVENTION

According to a first aspect of the present invention, there is provided an apparatus for enhancing portable functionality, comprising an item of clothing and a peripheral device attached to said item of clothing, wherein said item of clothing comprises: electrical conductors connected to a peripheral device connector; and said peripheral device comprises: a clothing connector configured to connect to said peripheral device connector, to electrically connect to said electrical conductors; wherein said peripheral device is configured to provide a first functionally when attached to said item of clothing; and said peripheral device is configured to provide a second functionality when detached from said item of clothing.

In an embodiment, the peripheral device is configured to communicate wirelessly with an external device.

According to a second aspect of the present invention, there is provided an apparatus comprising an item of clothing and a peripheral device, wherein: said item of clothing includes a first power source and is configured to supply power to said peripheral device; said peripheral device includes a second power source; and said peripheral device is configured to selectively use power from power sources comprising said first power source and said second power source.

In an embodiment, said peripheral device uses power from said first power source when attached to said item of clothing; said peripheral device uses power from said second source when detached from said item of clothing. An embodiment further comprises a switching device for switching to said second power source upon detection of the removal of said first power source. Furthermore, the functionality of the peripheral device may change after a detection of a removal of the peripheral device from an item of clothing.

In an embodiment, the peripheral device uses power from said first power source when operating at a first power level; said peripheral device uses power from said second power source when operating at a second power level; and said second power level is higher than said first power level. The peripheral device may remain attached to the item of clothing when operated at said second power level.

The invention will now be described by way of example only with reference to the accompanying Figures.

BRIEF DESCRIPTION OF THE SEVERAL VIEWS OF THE DRAWINGS

FIG. 7 illustrates an alternative control unit;

DETAILED DESCRIPTION OF THE INVENTION

FIG. 1

Figure 1:
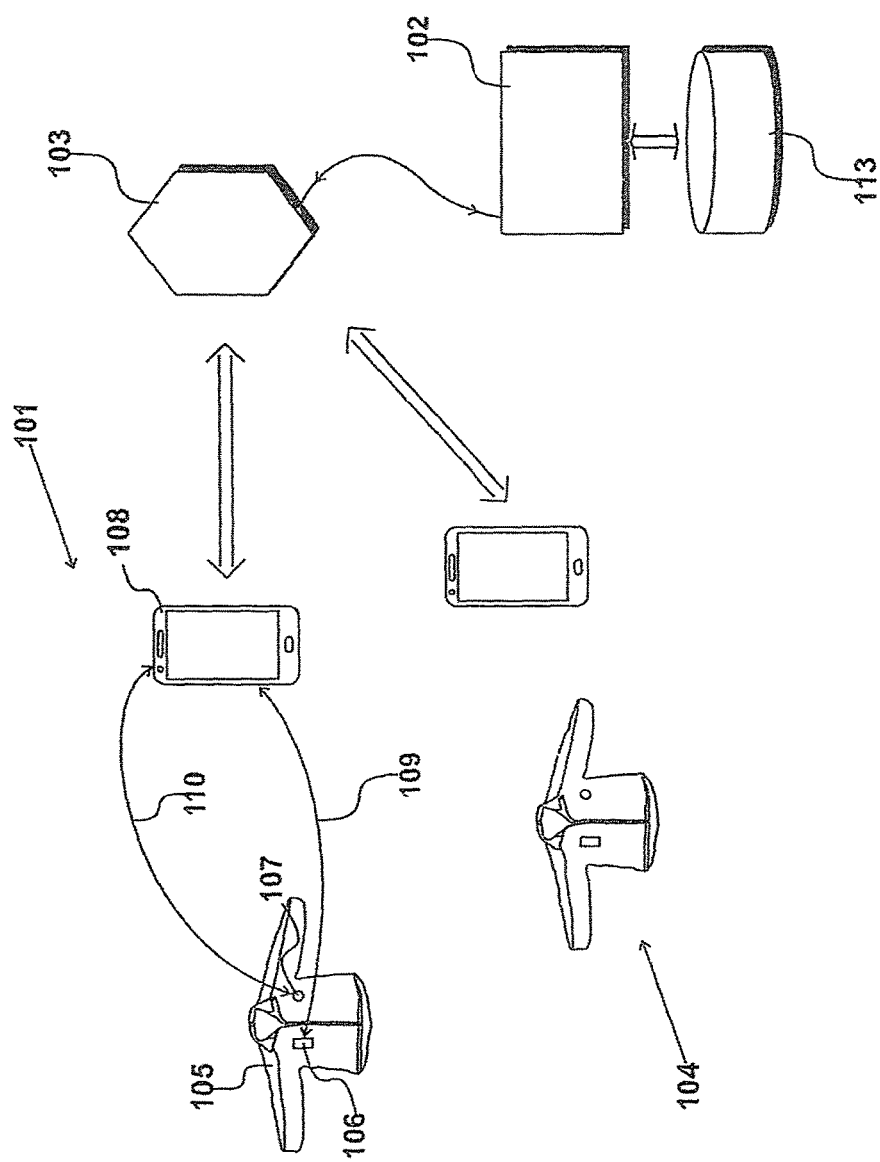
FIG. 1 shows an environment in which a communication system communicates with a central control station.

An operational environment is illustrated in FIG. 1, in which a communication system 101 communicates with a central control station 102 via a mobile cellular telephony network 103. Communication is also provided for additional systems, such as communication system 104. Thus, many communication systems of this type may be included within the operational environment. These systems may communicate with a main communication system 101 and, in an embodiment, communication may also occur between the individual systems operating within the environment.

The operational environment itself may present hazardous conditions and communication may be required in order to allow hazardous conditions to be observed and to ensure that operations are conducted in accordance with established protocols and health and safety requirements. Thus, it is possible to monitor the environment, monitor the task at hand, monitor the operational characteristics of the operatives and monitor the medical condition of the operatives.

Communication system 101, that may be considered as providing a personal area network, includes an item of clothing 105 that has electrical conductors included therein, along with a control unit 106 attached to these electrical conductors. In an embodiment, the conductors are provided by wires, possibly retained within seams. However, in alternative embodiments, conductive fabric having conductive threads may be deployed or conductive materials, such as inks, may be applied to a fabric base. A further electrical connector is attached to the electrical conductors, thereby allowing a peripheral device 107 to be detachably attached to the jacket.

In an embodiment, a plurality of connectors are provided, allowing peripheral devices to be attached at different locations and allowing a plurality of peripheral devices to be attached to each individual jacket. Thus, communication between these devices is made possible by the provision of the personal area network.

The system also includes an external communication device 108, that may be a mobile smart cellular telephone or a similar cellular-connected mobile device. In an embodiment, a standard cellular telephone is deployed as the external communication device 108 and all communications are made in accordance with protocols that are conventionally supported by a device of this type. As is known in the art, devices of this type present a graphical user interface to a user and although several commercial operating systems are available, many of the procedures and established activities are similar across these platforms and are well known to the general public; and hence would be well known to most operatives working within environments of the type identified in FIG. 1. Furthermore, the communication system 101 operates, in a preferred implementation, in a way that is familiar to operatives and presents them with graphical displays that are substantially similar to those recognised in alternative applications.

In use, direct communication between the control unit 106 and the external device 108 may take place using a Bluetooth low energy protocol, as illustrated by arrow 109. Communication between the peripheral device 107 and the external communication device 108 may take place using a Wi-Fi protocol, thereby providing a higher transmission bandwidth. Thus, a communication of this type is illustrated by arrow 110, connecting the peripheral device 107 directly to the external device 108. In this way, significant data volumes may be captured by the external device 108, possibly showing several hours of activity on the part of an operative. In addition, using the cellular network 103, this data may be uploaded to the central control station 102 and possibly archived onto a permanent storage device 113.

FIG. 2

Figure 2:
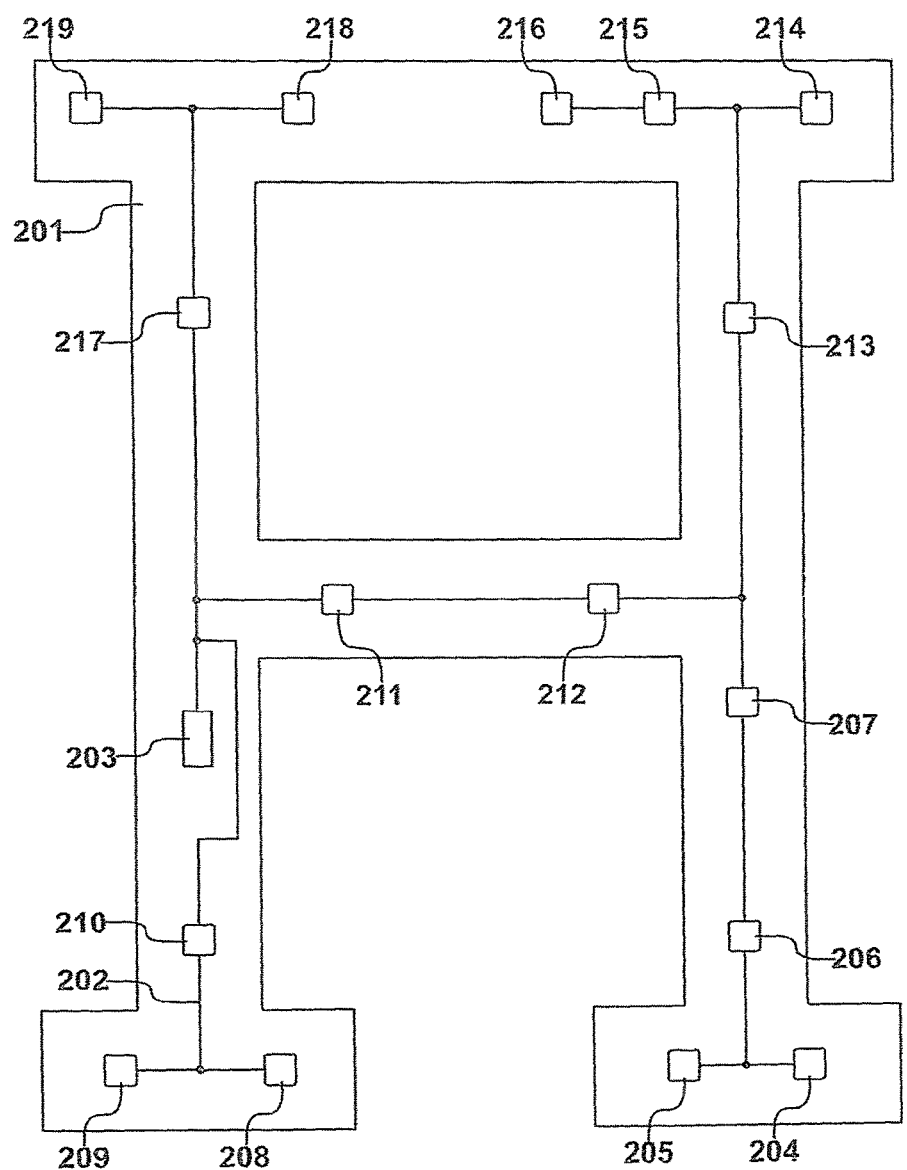
FIG. 2 illustrates a loom for deployment within a jacket of the type shown in FIG. 1.

The jacket 105 may be constructed with an active loom sub-assembly that is combined with a passive shell assembly. To construct the active loom sub-assembly, a substantially H-shaped fabric base 201 is established, as shown in FIG. 2, that may be relatively lightweight and may easily allow holes and openings to be created therein. In this way, it is possible for connectors to be attached, thereby allowing peripheral devices to receive power, receive data and transmit data.

Figure 5:
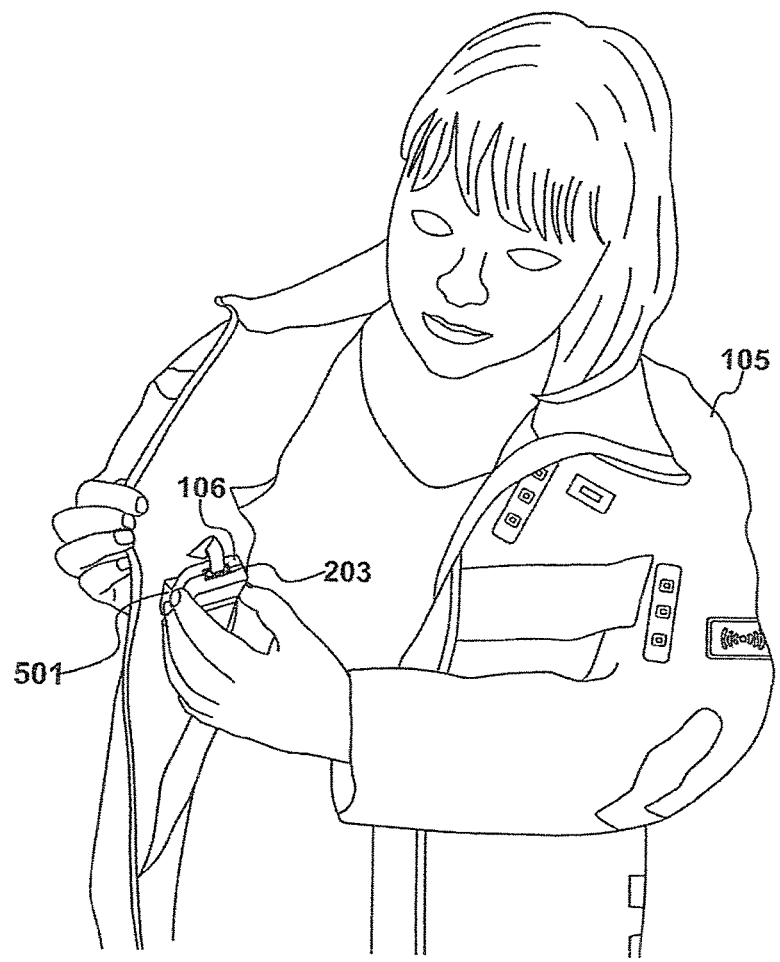
FIG. 5 shows the attachment of the control unit identified in FIG. 1.
Figure 6:
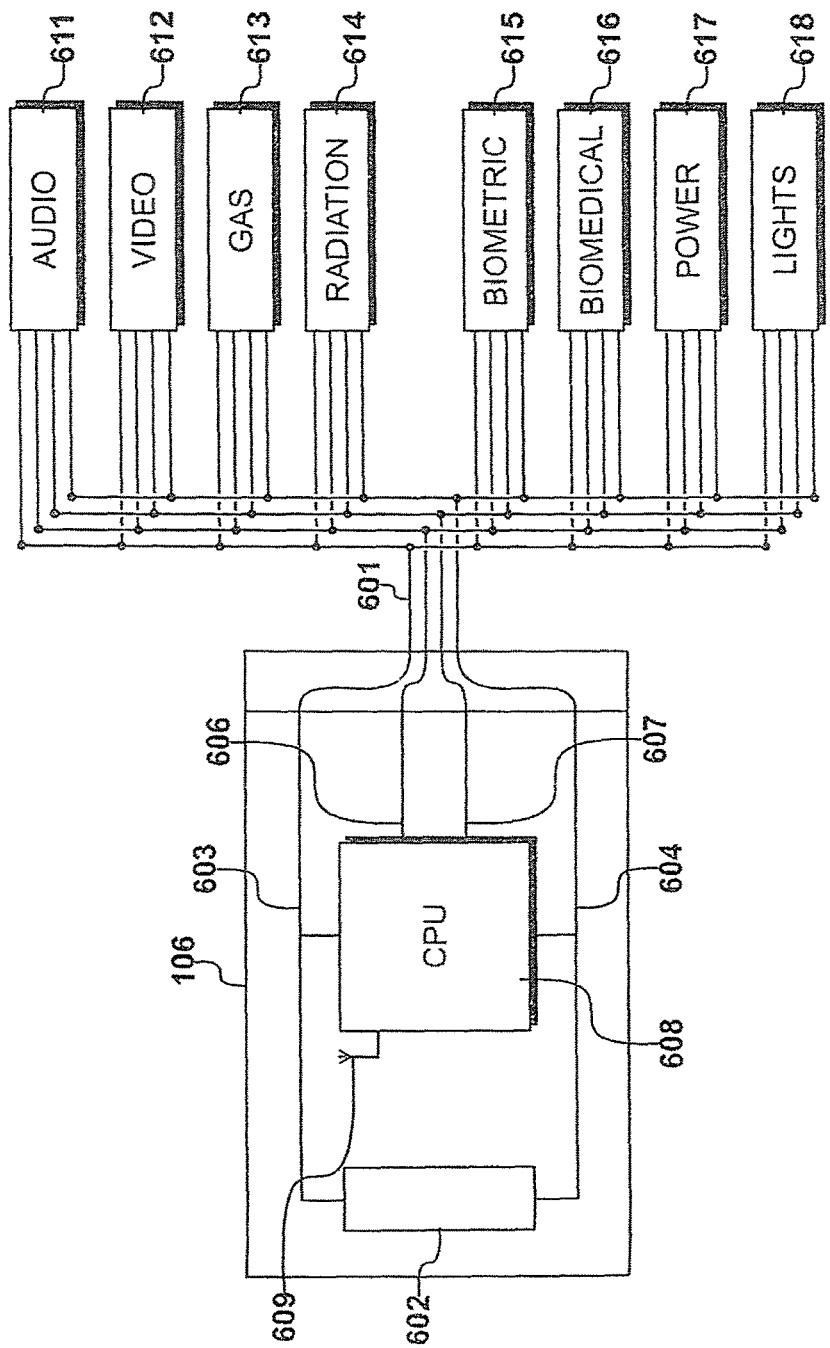
FIG. 6 details the control unit identified in FIG. 1.

A wire loom 202 is fabricated to extend from a connector 203 that connects to the control unit 106, as shown in FIG. 5. The wires in this loom are used to convey power from the control unit, transmit data and receive data. In an embodiment, as illustrated in FIG. 6, a total of four conducting wires (or other conductor types) are provided, allowing separate conductors to be used for conveying power and for transmitting data. In an alternative embodiment, as illustrated in FIG. 7, a single conductor is used for both power and data.

The H-loom configuration of FIG. 2 facilitates the application of connectors 204 to 207 for peripherals on the front left of the item of clothing, with connectors 208 to 210 being for peripherals on the front right of the item of clothing, connectors 211 and 212 being provided for peripherals on the collar of the item of clothing and connectors 213 to 219 being provided for peripherals at the rear of the item of clothing.

FIG. 3

Figure 3:
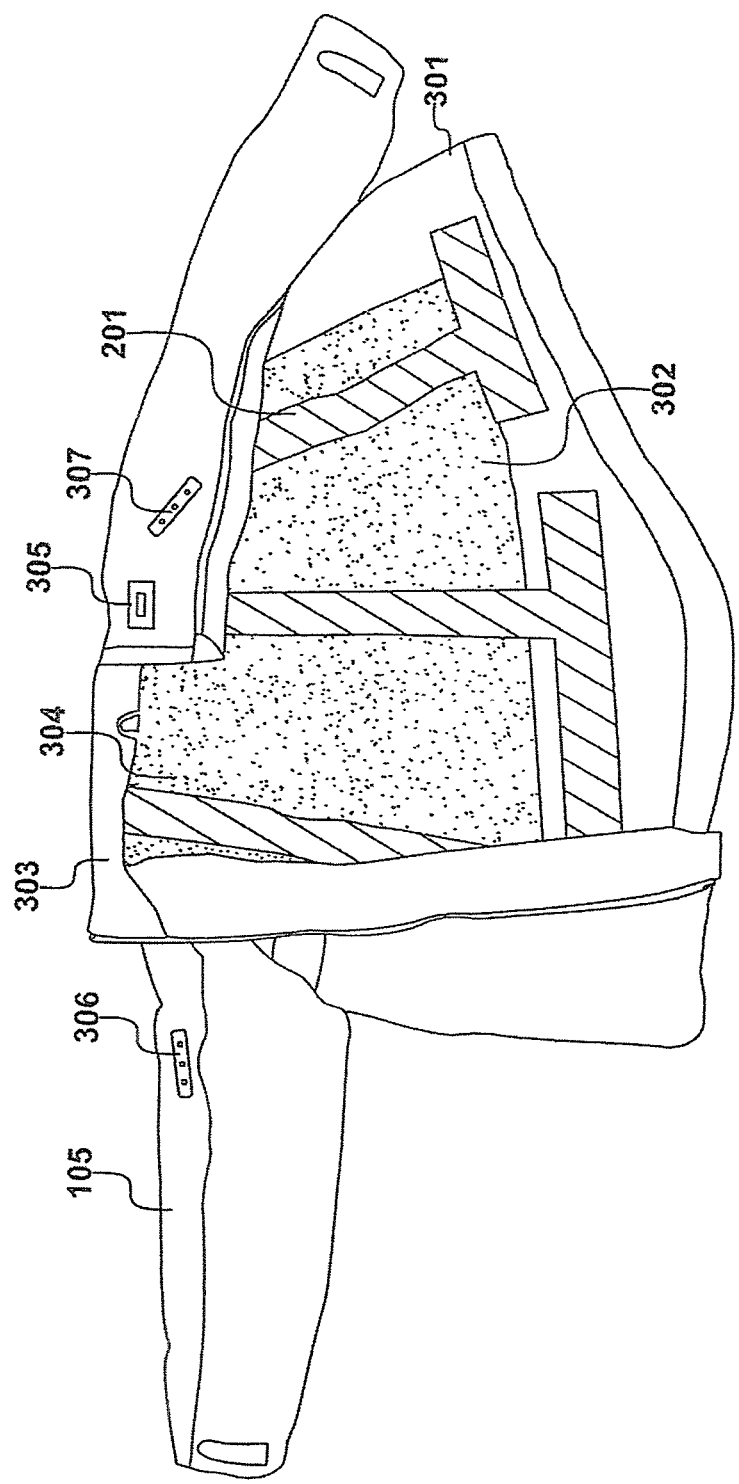
FIG. 3 details a jacket of the type shown in FIG. 1.

An example of an item of clothing, in the form of jacket 105, is illustrated in FIG. 3. A passive shell 301 is shown, that remains in an outer position. The H-loom 201 is located on an internal surface 302 and interface connectors extend through the fabric base in order to provide connections to peripheral devices.

In this embodiment, the passive shell includes an outer shell 303 and an inner shell 304. In this embodiment, the H-loom 201 is attached to the inner shell 304.

The embodiment of FIG. 3 also shows the location of a connector 305, for the attachment of a peripheral device. Permanently positioned peripheral devices are also present, in the form of a first light emitting device 306 and a second light emitting device 307.

FIG. 4

Figure 4:
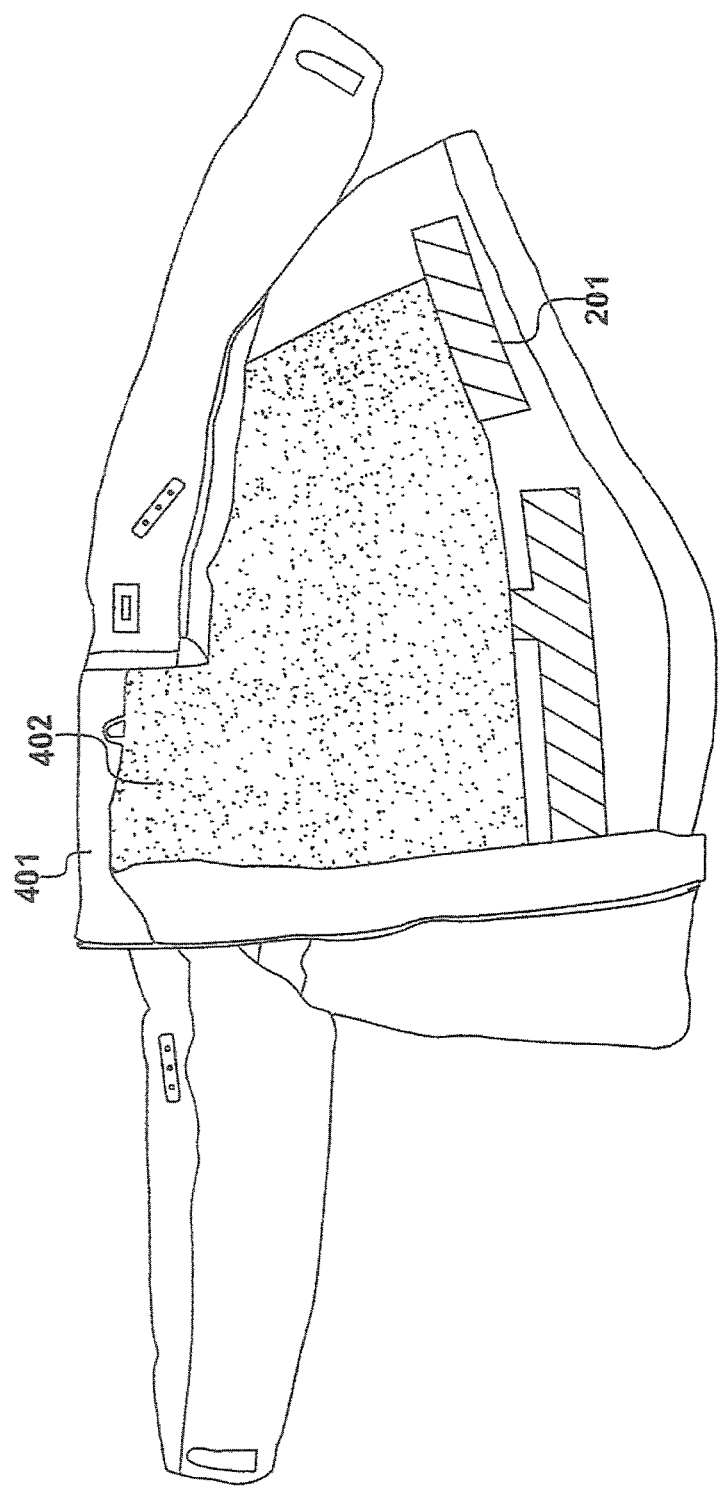
FIG. 4 illustrates an alternative jacket, with the loom deployed differently.

An alternative embodiment is identified in FIG. 4, in which the passive shell again includes an outer shell 401 and an inner shell 402. However, in this embodiment, the components are combined, such that the loom 201 is located between the inner shell 402 and the outer shell 401.

In this way, peripheral connections are made through the outer shell, in a manner substantially similar to that described with respect to FIG. 3. However, in this embodiment, the loom itself is protected by the inner shell 402.

FIG. 5

The control unit 106 includes a power source, possibly in the form of a rechargeable lithium cell or a battery of cells. Prior to being attached to connector 203, the control unit 106 may be charged. Thereafter, as illustrated in FIG. 5, the control unit 106 is attached to connector 203 and then restrained within an internal pocket 501 of the jacket 105.

Pocket 501 includes a flap and the control unit 106 may be permanently restrained within pocket 501 during deployment and during storage awaiting deployment. Prior to cleaning and ultimately recycling the jacket 105, the control unit 203 may be removed from pocket 501 by the reverse operation to that illustrated in FIG. 5.

In an embodiment, it is not necessary to remove the control unit 501 in order for the power source contained within the control unit to be recharged. During a period of deployment, the power source within the control unit 501 may be recharged by attaching a charging unit to a connector, such as connector 203, in a manner substantially similar to the attachment of a peripheral device. Thus, during deployment, a plurality of control units may receive charge when equipment is being stored between shifts.

FIG. 6

The control unit 106 is shown schematically in FIG. 6, connected to a four wire loom 601. In this embodiment, a rechargeable cell 602 supplies power on a power line 603, in combination with a return line 604. Data is transmitted on a data line 606, that works in combination with a clock synchronising line 607.

The control unit includes a central processing unit 608 that may be implemented as an nRF52832 system-on-chip device, supplied by Nordic semiconductor. This device includes an ARM cortex 32-bit processor and Bluetooth low energy transceiver circuitry, communicating via an antenna 609.

The provision of power, from cell 602, over lines 603 and 604, ensures that it is possible for peripheral devices to operate without their own internal power supply, which, for some peripheral devices, allows complexity to be reduced and charging operations to be avoided. If more power is required, an additional battery pack may be connected directly to the loom, as a further peripheral device, thereby allowing operatives to quickly install a recharged battery without being involved with the actual charging operation. In some environments, multiple battery devices may be required to enhance reliability.

Data connection 606 provides serial data communication, synchronised by a synchronising clock signal provided over conductor 607. The control unit 106 also includes power control circuitry and current limiting circuitry, as is known in the art. Thus, the control unit performs power management operations and oversees data communication to each of the peripheral devices. Furthermore, with the inclusion of the external communication device 108, as part of the overall system, it is possible for the external communication device 108 to provide sophisticated levels of device management; running appropriate application software on an in-built relatively high-power internal processor.

For operatives working in hazardous environments, the mobile cellular phone interface allows them to interact with devices using familiar touchscreen gestures. In addition, it also facilies the use of voice commands and other sophisticated procedures, without introducing expensive processing capability to the jacket loom itself.

Peripheral device 611 includes a microphone and generates audio data. The device may also include loudspeakers for reproducing audio data. However, the bandwidth required for the transmission of data of this type is too large for it to be carried over the loom 601.

Peripheral device 612 generates image data and video data. It may be possible to supply individual images at a low data rate over the loom 601 but the loom 601 is not capable of transmitting conventional video signals, even in a compressed format.

Peripheral device 613 is a gas constituent detector. The detector 613 may simply generate an alarm signal upon detecting a gas concentration that exceeds a predetermine level. Under these circumstances, the loom 601 is capable of transmitting a data signal of this type. However, it is possible that the gas consistent device 613 can also operate in a more sophisticated fashion, generating a larger data volume representing constituents and concentrations etc. Again, a point will be reached where the loom 601 is not capable of conveying data volumes of this type.

Peripheral device 614 is a radiation detector and again low levels of data may be generated representing a dangerous situation or larger levels of data may be generated in response to an ongoing monitoring procedure.

Peripheral device 615 is designed to generate biometric data, representing data generated in response to activities performed by operatives. Again, small levels of data may be generated, suitable for transmission over the wired connection, or higher levels of data may be generated, requiring an alternative route.

Peripheral device 616 is configured to generate biomedical data. Thus, this device can be used to monitor the health of operatives and produce alarm signals if dangerous situations are encountered. Again, low level alerts may be generated, for wired transmission, or higher levels of data may be generated in response to ongoing monitoring situations.

Peripheral device 617 provides additional power, as previously described. Thus, in some applications, power source 602 within the peripheral device may be exchanged for a larger external power source directly connected to the loom.

Peripheral device 618, identified in FIG. 3, represents a plurality of peripheral devices that provide illumination. A first level of illumination may be provided, via devices 306 and 307, merely to indicate the presence of an operative; possibly when working in low light levels. A further degree of activation may be provided if dangerous conditions are identified. Thus, dangerous conditions could be brought to the attention of an operative and an illumination could indicate that an operative is experiencing a hazardous situation and should withdraw. Furthermore, an alternative type of illumination could indicate that another operative within the environment is encountering a hazardous situation and may require assistance. An indication to the effect that other operatives require assistance may be identified as a "man down" situation and protocols are often in place to take appropriate action when conditions of this type are identified.

In a further embodiment, it is possible for higher power levels to be supplied to illuminating devices when dangerous conditions are identified and in an alternative embodiment, it is possible for illuminating devices to be removed, to provide a light source for an operative; devices of this type being provided with their own second power source for operation as a second functionality when detached from the jacket.

It is therefore anticipated that peripheral devices may be configured to stream data of a type that requires a relatively high bandwidth. However, this level of bandwidth is not provided by the data communication wires 606/607 within the loom of the wearable item. In this implementation, it is preferable to keep the wiring loom simple, given that the item of clothing may be washed and industrial dryers may operate at a temperature of up to 160° C. Thus, the control unit 106 and the peripheral devices 611 to 618 are detachable, so that only the conductors of the loom are introduced to the washing and drying cycle, with no embedded circuits. However, such an approach does create a constraint in terms of transmission bandwidth.

FIG. 7

In an alternative embodiment, a single wire 701, with a return 702, operates by sharing line 701 for both data and power. In this alternative embodiment, the arrangement may be consistent with the "1-wire protocol". Thus, in accordance with this protocol, data is transmitted in short bursts 703 over powerline 701 which, during other periods as shown at 704, transfers power. For each peripheral device operating under this system, power is maintained by a storage capacitor that is arranged to discharge during the data bursts 703. Thus, in this way, it is possible to reduce the number of conductors present within the loom, at the expense of reduced transmission bandwidth and lower current.

FIG. 8

Figure 8:
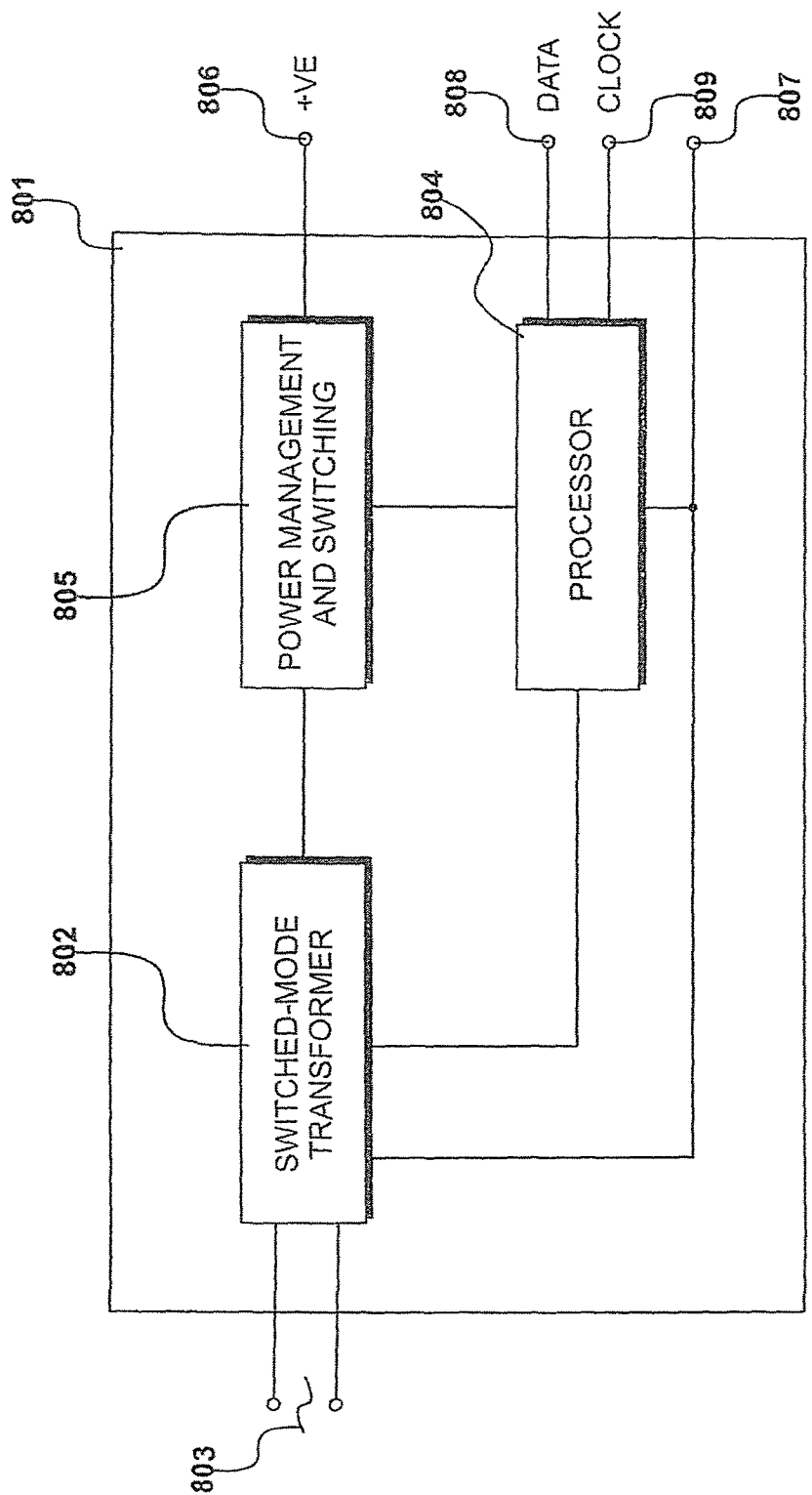
FIG. 8 shows a charging unit for charging loom connected devices.

A charging unit 801 for charging loom connected devices, including the control unit 106, is illustrated in FIG. 8. The charging unit 801 includes a switch-mode power supply circuit 802, that receives alternating mains electricity at terminals 803 to produce a five volt direct current output. This supplies an on board processor 804 and appropriate switching is controlled by a power management and switching circuit 805. This supplies positive charging power to the loom via a terminal 806, which is returned via terminal 807.

Processor 804 is configured to receive input data from the control unit 106 via a data terminal 808 and a clock synchronizing terminal 809. Thus, the charging device communicates with the control unit in a way that is substantially similar to other communications with peripheral devices. Thus, in this way, it is possible for the control unit to identify the charging device and to be informed that a charging operation is available as soon as the charging device has been connected.

Thus, it is possible for the charging unit to be used when the control unit has been removed from the jacket, when the jacket is being washed for example, but it is intended that the majority of charging operations will take place while the control unit is in-situ. Thus, when charging in-situ, a charging cable connects the charging unit to the jacket loom via a standard peripheral device connector on the jacket.

In this embodiment, the control unit 106 periodically sends out a "who's there" command, to identify any newly attached devices. When the charging unit is connected, the control unit identifies the device and thereby identifies that it is a charging unit. Using the exchange of serial data over the loom, various specification details may be conveyed between the devices, such that the control unit is in a position to determine whether charging is required and the charging unit receives an indication of the type of charge required. Thus, charging requirements are confirmed (it not being desirable to perform unnecessary charging) such that, where appropriate, the control unit 106 issues an instruction to the charging unit 801 to initiate a charging cycle.

Upon receiving an instruction to charge, the power management and switching circuit 805 is switched to provide a high charging voltage to the loom, of typically between four volts and five volts, which is then switched to connect directly to the cell in the control unit. In addition, similar operations may take place for the charging of other cells/batteries connected to the loom. Thus, the charging of peripheral devices is also performed under the control of the control unit 106. The control unit 106 performs a similar dialogue with the charging unit but when switching is performed, the cell within the control unit is disconnected and an external battery within another peripheral device is connected, in order to receive charge.

During each charging cycle, voltages are monitored and the control unit continues periodic communication with the charging unit to ensure that charging takes place according to previously established requirements. For example, fast charging may be possible under some circumstances but if it is possible to perform a charging cycle overnight, for example, fast charging is avoided in order to optimise battery life. Thus, the control unit 106, under instruction from the external device 108, will negotiate charging conditions and requirements with the connected charger, in order to schedule the charging of all rechargeable cells/batteries that require a charging cycle.

FIG. 9

Figure 9:
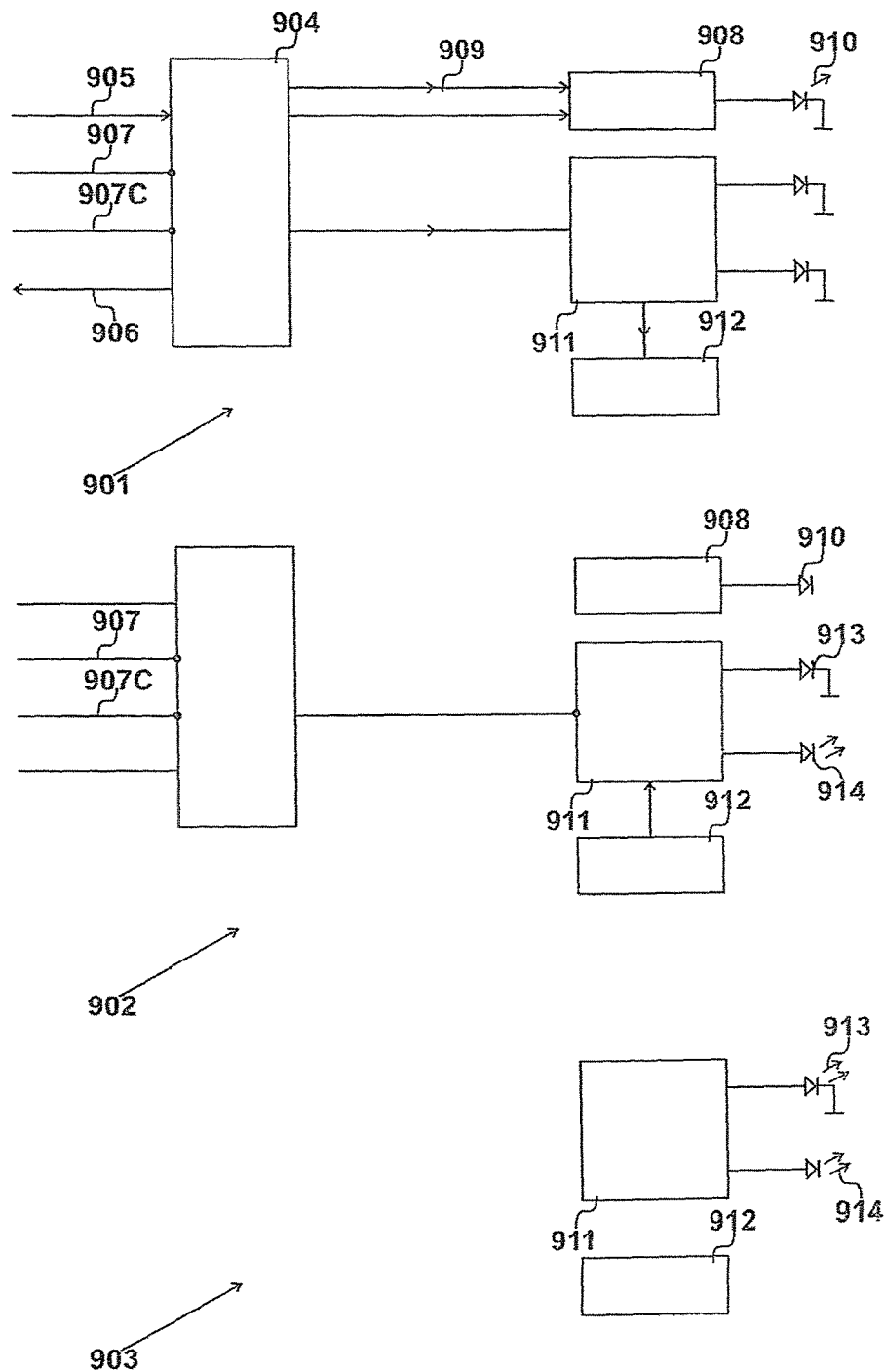
FIG. 9 shows a peripheral device for providing illumination.

A peripheral device for providing illumination, of the type indicated at 618, is illustrated in FIG. 9. At 901, the device is shown providing a first functionality, while attached to the jacket. At 902, the device is shown providing a second functionality while still attached to the jacket. At 903, the device is shown providing a second functionality while detached from the jacket.

The peripheral device includes a jacket connector 904. Power is supplied to the jacket connector 904 over a loom wire 905 and returned via a loom wire 906. Data is received on a data line 907 working with the clock synchronizing wire 907C and instructing the peripheral device to perform its first functionality. A first functionality circuit 908 receives power on a line 909 via powerline 905 and the connector 904. This in turn results in the illumination of a first LED device 910.

A second functional device 911 also receives input power via connector 904, which is relayed to an internal rechargeable cell 912. Thus, while in a passive mode or while providing a first functionality, a second power source 912 receives charge and as such, does not need to experience a specific recharging operation.

As illustrated at 902, a data instruction may be received on data line 907 which results in the ceasing of power consumption by functional circuit 908 followed by an activation of functional circuit 911. Under these conditions, LED device 910 ceases to receive power and is no longer energised. However, a second LED device 913, along with a third LED device 914, both receive power and are illuminated. However, the illumination of devices 913 and 914 requires significantly more power than that required by device 910 and, as such, insufficient power is available from the loom. Consequently, when providing this functionality, power is derived from the second power source 912.

When providing this second functionality and when powered from the second power source 912, the peripheral device is no longer dependent upon receiving power from the loom and may therefore be detached from the loom, as illustrated at 903. Thus, when detached, functional circuit 911 continues to provide functionality (illuminating LED 913 and illuminating LED 914) by receiving power from the second power source 912.

Figure 14:
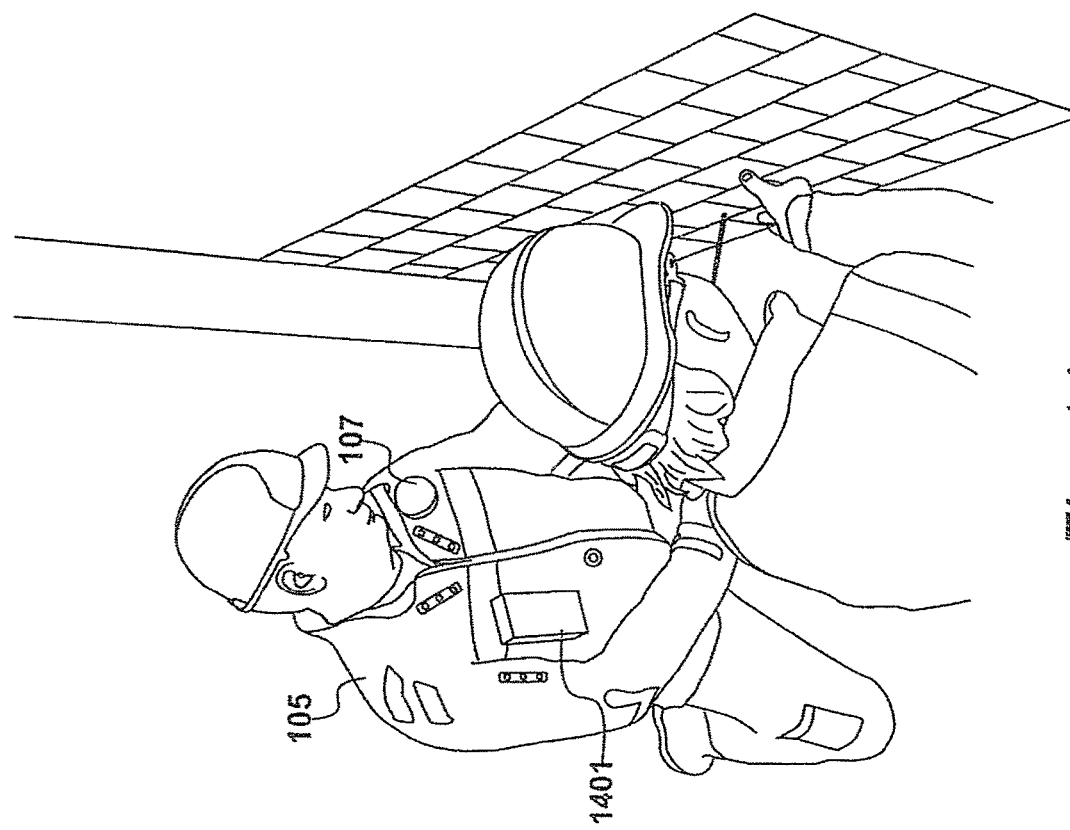
FIG. 14 shows operatives working in hazardous conditions.

In an embodiment, the mode of operation identified at 901 may allow illumination devices to indicate the presence of operatives, which would represent a normal operating state when operatives are working in hazardous conditions, as illustrated in FIG. 14.

While working in hazardous conditions, it is possible that a particular hazard may be identified and LED devices may be illuminated at a higher power level to provide a warning to the operative. Similarly, warnings of this type may be issued if a hazard has been detected by another operative within the same environment. Thus, as illustrated at 902, a higher output energy level is provided by receiving energy from a second power source 912.

Detachment of the peripheral device may also provide a second functionality and this second functionality may be supported by receiving power locally from the second power source 912, without any physical connection to the jacket loom, as illustrated at 903.

FIG. 10

Figure 10:
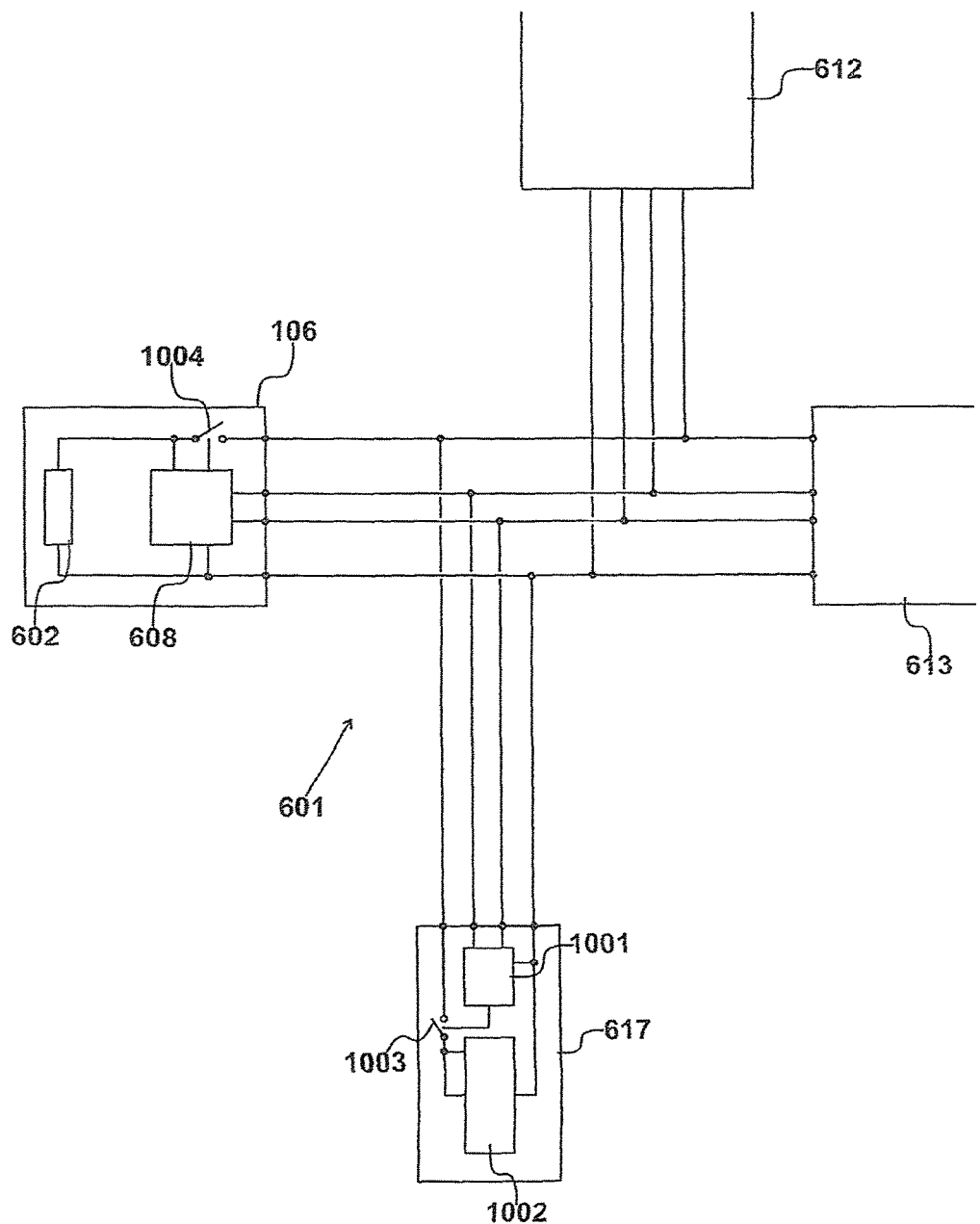
FIG. 10 shows an example of devices connected to a loom.

An example of devices connected to a loom is illustrated in FIG. 10. The loom 601 effectively provides a bus, with transmission data including addressing data, to identify the intended recipient.

As previously described, control unit 106 includes a processor 608 and a first power source 602. Peripheral device 612 generates image data and peripheral device 613 generates gas concentration data.

Peripheral device 612 provides a first functionality by receiving power from the loom 601. Power from the loom also recharges a second power source within the peripheral device, such that the peripheral device may be detached in order to provide a second functionality. Similarly, the gas concentration device 613 may provide a first functionality when attached to the loom and again the device may provide a second functionality when detached from the loom, receiving power from its own local second power source.

When attached to the loom 601, respective second power sources in devices 612 and 613 are recharged by receiving loom current. Consequently, it is possible that the first power source within the control unit will have insufficient capacity for maintaining operation throughout an operational period. Thus, under these circumstances, a further peripheral device 617 is attached to provide a replacement first power source.

The replacement first power source includes a processor 1001 and a battery 1002 of rechargeable cells. A switch 1003, controlled by processor 1001, connects battery 1002 to the loom. Under these circumstances, a switch 1004 within the control unit disconnects the primary first power source 602, thereby allowing the replacement first power source 1002 to take over. This condition is initiated by the processor 608 in the control unit, which issues a command to peripheral device 617. Thus, device 617 applies power to the loom, such that the control unit may disconnect its own power source 602.

When receiving charge from the charging unit shown in FIG. 8, switch 1004 will close when switch 1003 is open, thereby charging the first power source 602 in the control unit. During a recharging operation, priority is given to the recharging of this cell, to ensure that the control unit continues to function.

Having recharged the primary first power source 602, it is possible for switch 1004 to open and for switch 1003 to close, thereby recharging the secondary first power source 1002. Similar switches may be provided in the other peripheral devices, including devices 612 and 613, such that only one such switch is closed during a recharging procedure and each device undergoes its own unique recharging cycle.

It should also be noted that when switches 1003 and 1004 are open, their local processor (1001 and 608 respectively) continue to receive power from their local supply (1002 and 602 respectively).

FIG. 11

Figure 11:
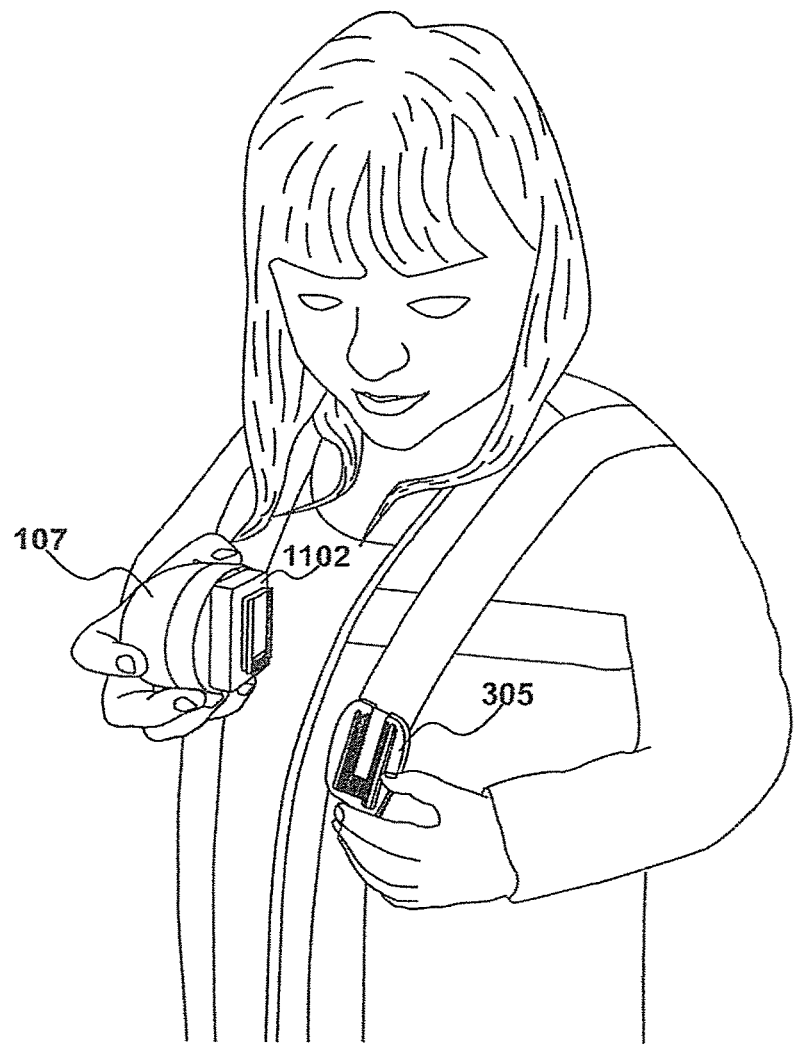
FIG. 11 shows the attachment of a peripheral device.

Peripheral device 107 is shown in FIG. 11. The peripheral device 107 has a clothing connector 1102 configured to connect with a peripheral device connector, such as connector 305, on the item of clothing. When this connection is made, the peripheral device 107 is mechanically supported in position by appropriate attachment elements. Thus, these attachment elements may be mechanical or magnetic, for example.

In an embodiment, measures are taken to ensure that the electrical connectors connect, when a mechanical connection of a peripheral device to a jacket has been made. Thus, when deploying the four wire system as illustrated in FIG. 6, all four electrical terminals of the peripheral device connector electrically connect with the four electrical terminals of the clothing connector 305.

FIG. 12

Figure 12:
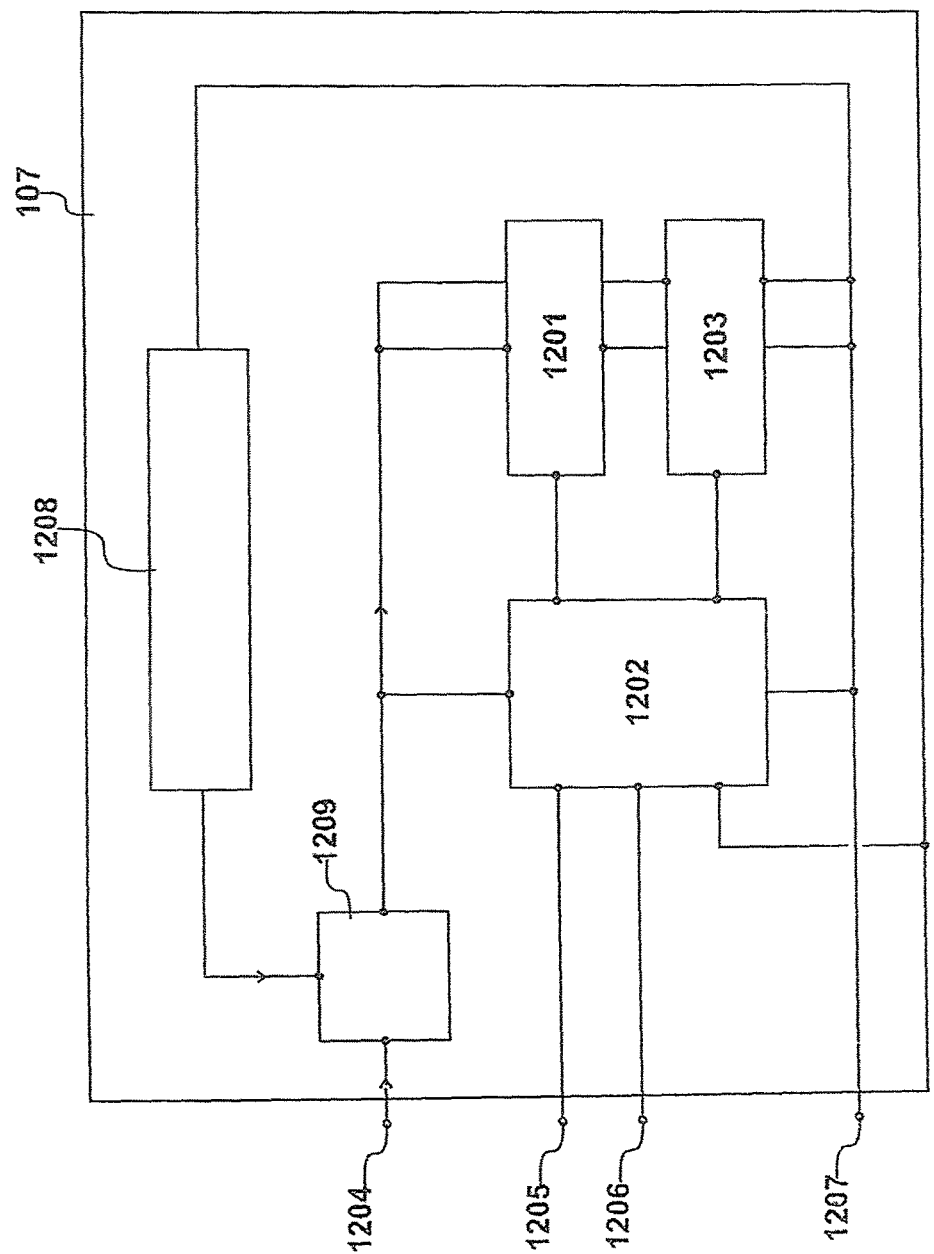
FIG. 12 shows a schematic representation of the peripheral device identified in FIG. 1.

A schematic representation of peripheral device 107 is illustrated in FIG. 12. This facilitates the provision of an apparatus for enhancing portable functionality, because the peripheral device 107 may be attached to an item of clothing. The item of clothing itself has electrical conductors connected to the peripheral device connector 305. The peripheral device 107 has a clothing connector 1102 configured to connect to the peripheral device connector, so as to electrically connect with the electrical conductors 501 in the item of clothing.

The peripheral device is configured to provide a first functionality when attached to the item of clothing and to provide a second functionality when detached from the item of clothing.

In the embodiment illustrated in FIG. 12, a first functional device 1201 provides a first functionality and is deployed, under the control of a central processing unit 1202, when the peripheral device has been attached to the item of clothing.

In addition, a second functional device 1203 is provided, which in turn provides a second functionality when the peripheral device is detached from the item of clothing. Thus, the peripheral device may provide image data. The first functional device 1201 may be a relatively low definition, single image camera. The first functionality may include compressing the image and thereby allowing the image data to be conveyed to the control unit 106 over the wiring loom at a relatively low data rate, for example to provide a low resolution snapshot of an operational environment.

The second functional device 1203 may be a higher definition video camera, configured to generate, as a second functionality, video data at a relatively higher definition and at full video frame rate. As described with reference to FIG. 13, the peripheral device, upon attachment, will automatically configure itself to provide a secure channel of communication directly to the external communication device 108 and thereby, when deploying the second functionality, allow the output data to be transmitted at a relatively higher rate. This allows real-time viewing on device 108 and the real-time distribution of the video data to the central station 102.

In FIG. 12, the first functional device 1201 is shown as being completely separate from the second functional device 1203. It should be appreciated that the physical components of these devices may, to a large extent, be shared and the actual functionality may be determined in response to the execution of stored commands.

When the peripheral device 107 is connected to a jacket 105, the peripheral device receives power from positive power line 603 via a first terminal 1204. Data, over conductors 606 and 607, are received at a second terminal 1205 and a third terminal 1206 respectively. The return cable 604 is connected to a fourth terminal 1207. In this way, the item of clothing includes a first power source 602 and is configured to supply power to the peripheral device 107. The peripheral device includes a second power source 1208 and the peripheral device is configured to selectively use power from either the remote power source 602 or the local power source 1208.

When detached, and thereby possibly providing a second functionality, it is necessary for the peripheral device 107 to derive power from its own local power source 1208. However, it is possible for the second functionality to be provided while the peripheral device remains attached to an item of clothing. Under these circumstances, both the first functionality and the second functionality may derive power from the remote source 602.

Thus, for some peripheral devices, it is possible to provide a first functionality and a second functionality without requiring a second power source to be provided locally. However, in an embodiment, a higher level of power may be required when providing the second functionality and this power may be derived from the local power source 1208. Furthermore, in an embodiment, when not required to perform a second functionality, it is possible for the second local power source 1205 to receive charge from the remote power source 602.

When providing a first functionality, power from the loom may be directed towards the first functional device 1201. However, during passive periods, when the first functionality and the second functionality are not required, it is possible for the second power source 1208 to receive charge from the first power source.

Figure 15:
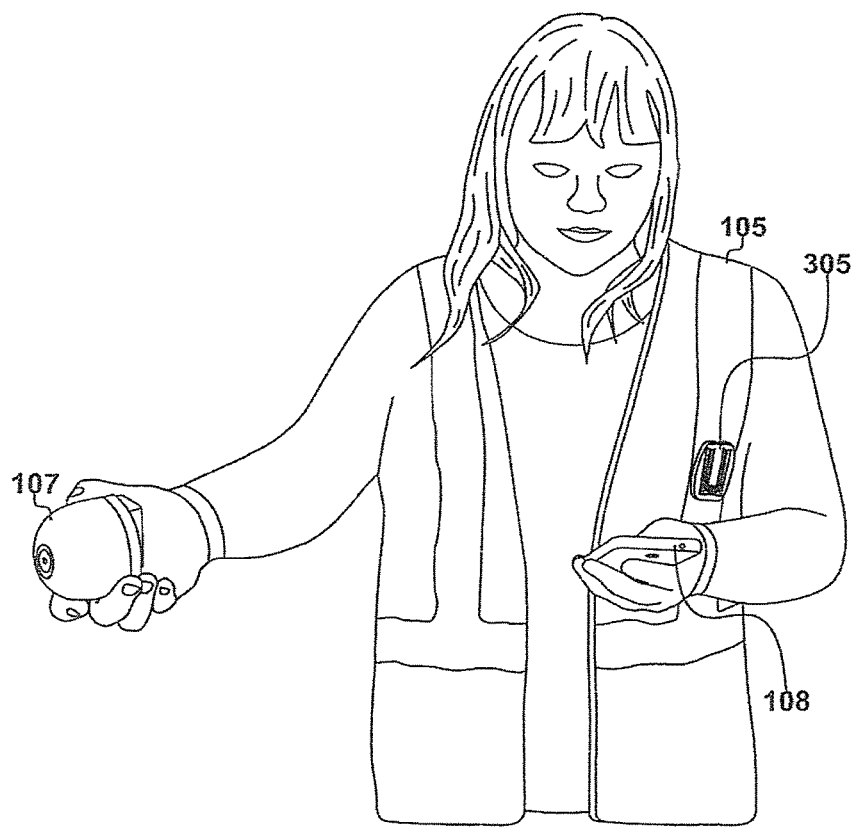
FIG. 15 shows a detached peripheral device providing a second functionality.

The second power source 1208 may, for example, take the form of a lithium-ion cell (or battery of cells) or a supercapacitor. A selection of an appropriate device for the second power source will be determined by the requirement of the second functionality, in terms of peak current and operational duration. Thus, for example, a second functionality may provide an enhanced level of illumination (requiring a substantial current for a short period of time) while a high definition photograph is taken. Thus, power is derived from the second power source 1208 while the peripheral device is providing the second functionality and the peripheral device may be removed from the jacket, as shown in FIG. 15, while providing the second functionality.

This approach allows the peripheral device to operate when detached or, for short periods of time, allows the peripheral device to operate at relatively high power levels; levels that would not be available from the remote cell 602. However, from an operative's perspective, the device appears as if it does not have a battery and as such it does not require to be recharged and it does not require batteries to be replaced. Thus, an operative or a supervisor does not need to concern themselves with charging peripheral devices before their deployment.

When deploying lithium-ion batteries, it is preferable not to connect them in parallel, therefore embodiments will tend to make a selection from either the first power source 602 or the second power source 1208.

The peripheral device may remain attached and occasionally have a high power requirement when providing its second functionality. Thus, for example, the peripheral device may occasionally require a current of, say, five amps from its own internal source 1208. In an embodiment, this level of current is too large to be transferred over the wiring and contacts of the loom. Thus, during these high current requirements, power is taken from the internal battery 1208. When this level of power is not required, the internal battery 1208 may be trickle-charged from the remote battery 602, over the loom wires.

It is recognised that, at high currents, problems occur when transferring power over long wires with multiple connectors. Each of these components has resistance and particular problems occur due to the existence of contact resistance. The contacts are subject to electrochemistry and the effects of this become more apparent with increased currents and the resulting resistance heating. As soon as a small amount of damage or tarnishing of the connectors has occurred, electrical conduction reduces significantly, with a resulting increase in the local heating due to the increased resistance. Thus, a highly non-linear effect results, which will tend to cause failure of the system.

Thus, in an embodiment, measures are taken to limit the maximum current that may pass through the device connectors, in order to enhance their reliability. Consequently, in an embodiment, any device that requires significant current (which may be set at anything higher than, say, a few hundred milliamps) is equipped with its own internal power source (battery or super capacitor) which is then trickle-charged when the high current is not required or when the peripheral device is in a non-active state.

It is also appreciated that for the deployment to operate correctly, the duration of the high current should be considerably less than that of the charging phase. Thus, for example, in the example of a high intensity LED floodlight, of 20 watts or so, it may be configured to operate for up to one minute in a period of one hour.

A power control circuit 1209 is provided that includes a power selector switch and a voltage multiplier. The power selector switch may be a MOSFET switch, controlled by processor 1202. Thus, the selector switch selects power from the remote source 602, via terminal 1204, or from the local source 1208.

The processor 1202 monitors available voltages to check whether a voltage at terminal 1204 is present. A capacitor keeps the processor 1202 running if the power suddenly disappears.

In an embodiment, a loss of voltage at terminal 1204 will occur if the detachable device is detached. The loss of this voltage triggers an interrupt, causing processor 1202 to switch the power source, via device 1209, to the internal source 1208. Where appropriate, this operation may also switch functionality from the first functional device 1201 to the second functional device 1203.

In an embodiment, processor 1202 only changes functionality after a short time delay, to ensure that an operative's gesture of removal is deliberate. However, power source switching occurs immediately, to ensure that the processor 1202 continues to operate; the supply capacitor will only provide power for a fraction of a second.

In an embodiment, it is possible for the peripheral device to distinguish between a removal event and a power-down event. In this embodiment, the control unit 106 sends a power down command to all devices, prior to removing power from the loom. Thus, if a device detects a power loss (without receiving a power down command) the peripheral device will automatically select power from the second source 1208 and possibly select its second functionality.

A voltage multiplier, in the power control circuit 1209, facilitates trickle charging. The voltage appearing at the first terminal 1204 may vary from 3.3 volts to 4.2 volts, depending upon the state of charge of the control unit battery 602; or any other battery device that is currently supplying power, such as device 517.

In order to charge internal battery 1208, a higher voltage is required. This higher voltage is generated using a boost circuit, as is known in the art, in which an inductor is switched at a frequency of several hundred kilohertz and the resulting fly-back is trapped by a diode and a capacitor. The output voltage is regulated by modifying the switching waveform pulse width ratio, thereby ensuring that the second power source 1208 safely receives charge when required and is available to safely supply power when demanded. Thus, when the peripheral device is connected to the loom, the voltage multiplier generates a suitable output voltage, that is applied by a battery charging circuit configured to charge internal cell 1208.

In an embodiment, as previously stated, it is possible to "trickle-charge" the local battery 1208. However, in an alternative embodiment, cell 1208 is charged at a higher rate than what would normally be considered a "trickle" and may draw up to a hundred milliamps when under charge. This ensures that the functionality deriving power from the local battery 1208 can be made available again in a reasonably short period of time. Thereafter, the cell's charge could be maintained by a trickle charging process, but this only occurs intermittently when the cell's monitored voltage falls below a predetermined threshold.

FIG. 13

Figure 13:
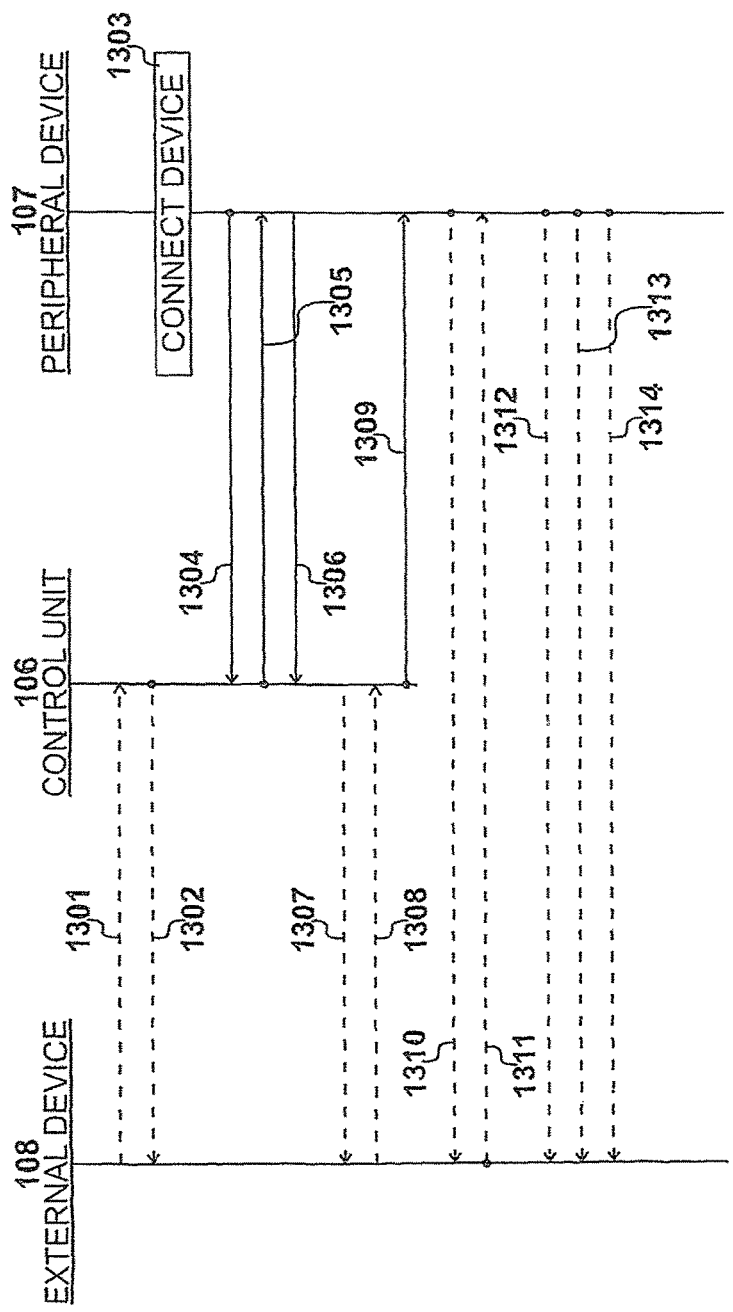
FIG. 13 shows a protocol diagram identifying communications between devices.

A protocol diagram is illustrated in FIG. 13, identifying communications between the control unit 106, the peripheral device 107 and the external device 108. In the diagram of FIG. 13, wireless communications are illustrated by dotted horizontal lines and wired communications, taking place over loom 601, are indicated by solid lines.

The control unit 106 and the external communication device 108 communicate via a Bluetooth low energy (BLE) protocol. Thus, the external device 108 may convey data to the control unit 106 indicated at 1301 and, similarly, data may be supplied from the control unit 106 to the external communication device 108, as indicated at 1302.

Prior to deployment in the field, the control unit 106 is bonded with the external communication device 108 in a conventional one time BLE bonding process.

After the control unit 106 has been bonded with a particular external communication device 108, it will remain bonded; remaining bonded even after power has been removed from all devices within the system. When power is restored, a wireless device (such as peripheral device 107) may be attached to the loom, using connector 1102 as previously described. Communication over the loom may then take place using the serial data line 506 and the serial clock line 507, possibly in accordance with SMBus protocols.

Connection of peripheral device 107 is indicated at 1303. Upon connection, the control unit 106 determines whether or not peripheral device 107 is a wireless device. If the peripheral device 107 is identified as a wireless device, control unit 106 will initiate procedures to enhance communication bandwidth with the external communication device 108.

If a newly attached peripheral device (other than device 107) is not a wireless device, communication between this peripheral device and the external communication device 108 is established by a combination of data transmission over the wiring loom and wireless BLE communication between the control unit 106 and the external communication device 108. Logically, the external communication device 108 then identifies all of the connected peripheral devices as being connected and as having data communication capability. However, some of this communication will be performed directly over a high bandwidth wireless link, when the option is supported by the peripheral device concerned.

Communication between the control unit 106 and the external communication device 108, as indicated at 1301 and 1302, allows operational parameters within the system to be controlled in response to manual interaction with a graphical user interface, presented by the external communication device 108; possibly implemented as a fully functional smart cellular mobile telephone.

Upon connection 1303 of the peripheral device, a wired data communication is made from the peripheral device 107 to the control unit 106, as indicated at 1304. This communication is acknowledged by the control unit 106, as indicated at 1305 and thereafter, the peripheral device 107 may supply operational data to the control unit 106, as indicated at 1306.

The method illustrated in FIG. 13 provides a personal area network for electronic devices operating within an environment established by a wearable item. A first wireless data connection is established between the control unit 106 and the external data communication device 108. In the embodiment, this is a Bluetooth low energy connection and the control unit 106 is bonded with the external communication device 108, in accordance with established Bluetooth protocols.

Peripheral device 107 is attached to the wearable item, the wearable item having electrical connections that create a first wired data communication with the control unit.

First configuration data are exchanged between the peripheral device 107 and the external communication device 108, via the first wireless data connection, the control unit and the first wired data connection. This allows a second wireless connection to be made directly between the first peripheral device 107 and the external communication device 108, following the exchange of this configuration data.

In the embodiment illustrated in FIG. 13, the control unit 106 wirelessly (over the first wireless BLE connection) informs the external communication device 108 to the effect that a new peripheral device has been connected, as indicated at 1307.

As indicated in FIG. 13 at 1308, configuration data is supplied from the external communication device 108 to the control unit 106, over the BLE connection. This exchange of configuration data may include an identification of a wireless network password for the external communication device, representing details of how the external communication device 108 communicates through a high bandwidth second wireless communication channel; possibly operating in accordance with established Wi-Fi protocols.

The configuration data from the external communication device 108 is received by the control unit 106 and, in an embodiment, this configuration data is buffered by the control unit 106. As indicated at 1309, the configuration data is then relayed from the control unit 106 to the peripheral device 107. Thus, having received this configuration data, it is now possible for peripheral device 107 to establish a direct wireless connection, in accordance with a Wi-Fi protocols, to the external communication device 108. Thereafter, it is possible for the peripheral device 107 to transmit operational data directly to the external communication device 108.

As illustrated in FIG. 13, the peripheral device 107, having established a Wi-Fi connection, issues a request to transmit operational data, as indicated at 1310. In response to receiving this request, the external device 108 issues an acknowledgement, as indicated at 1311. Thereafter, the peripheral device 107 is in a position to transmit relatively high volumes of operational data, as indicated at 1312, 1313 and 1314. This operational data may be of a type non-exclusively selected from the data types identified in FIG. 6, including; audio data; video data; gas constituent data; radiation data; biometric data and biomedical data.

Thus, having bonded in this way, any wireless peripheral device that is attached to the wiring loom can be paired and bonded automatically to the external communication device 108. This provides a significant advantage, in that individual devices do not need to be equipped with NFC or any other extra circuitry to facilitate a bonding process. Thus, without additional complications, or requiring manual intervention from an operative, high bandwidth plug-and-play functionality is achieved.

FIG. 14

Operatives are shown working in hazardous conditions in FIG. 14. The first peripheral device 107 has been attached to jacket 105 and is operational. It is providing its first functionality and is receiving power from the internally secured control unit 106. Peripheral device 107 is capable of high bandwidth data transmission to an external communication device. It is also capable of being removed from the jacket, to provide a second functionality; again, data is streamed to an external communication device, as shown in FIG. 15.

A second peripheral device 1401 has been attached to jacket 105; the jacket having at least a second set of electrical connections. In this way, a second wired data connection is made to the control unit 106. In this example, it is assumed that peripheral device 1401 provides a different type of first functionality and second functionality. While providing its first functionality, it only generates a modest degree of operational data. Consequently, this second operational data is transmitted from the second peripheral device to the external communication device via the second wired data connection, being relayed by the control unit and then passed on via the first wireless data connection.

To achieve this form of communication, second configuration data is exchanged between the control unit and the second peripheral device upon attachment of the second peripheral device to the second set of electrical connections. When exchanging data, the second peripheral device may also receive appropriate configuration data for communicating directly with the external communication device. However, communication of this type is only required when the second peripheral device provides second functionality, upon being detached from the jacket 105.

The item of clothing 105 includes a first power source 602 and, by attaching a peripheral device to a connector, power is supplied to the peripheral device. Both peripheral device 107 and peripheral device 1401 include a second local power source. Thus, each peripheral device is configured to selectively use power from the remote power source, supplied over the loom, or from a local power source (a second power source).

Peripheral device 107 uses power from the first power source when attached to the item of clothing and the peripheral device 107 then uses power from the second power source when detached from the item of clothing. Switching device 1209 switches the power sources upon detection of the device being detached. Upon detachment, peripheral device 107 changes functionality, from a first functionality to a second functionality. For the purposes of this example, it is assumed that peripheral device 107 is a camera device. Still images are captured as part of the first functionality, powered by the first power source 602. Upon detachment, video data is generated under a second functionality and video data is streamed to the remote communication device. The peripheral device 107 is therefore powered from its local (second) power source 1208.

In an alternative embodiment, a first functionality produces image data in response to receiving light within the human-visible spectrum. However, when removed and providing second functionality, the image data may be derived from light outside of said visible spectrum. For example, image data may be produced in response to receiving infra-red radiation, such that the data effectively represents a thermal image. In hazardous environments, devices of this type can be useful for detecting leaks for example.

For the purposes of this example, it is assumed that the second peripheral device 1401 is an illumination device. It may operate at a first power level, during which power is received from the remote (first) battery. In addition, device 1401 may operate at a second power level, higher than said first power level, by receiving power from a local (second) battery. Peripheral device 1401 may remain attached to the item of clothing when operating at this second power level. A third mode exists during which device 1401 is not operating and during this period, the second power source (the local power source) may receive charge from the first (remote) power source.

FIG. 15

Peripheral device 107 is shown providing a second functionality, when detached from jacket 105, in FIG. 15. Peripheral device 107 provides this second functionality while receiving power from its own local power source 1208. A direct wireless data communication channel has been established between peripheral device 107 and an external communication device 108. In this example, the peripheral device, when detached, generates video data that is streamed to the external communication device 108. Thus, this video data may be viewed by the operative, viewed by another operative or relayed to a remote location.

FIG. 16

Figure 16:
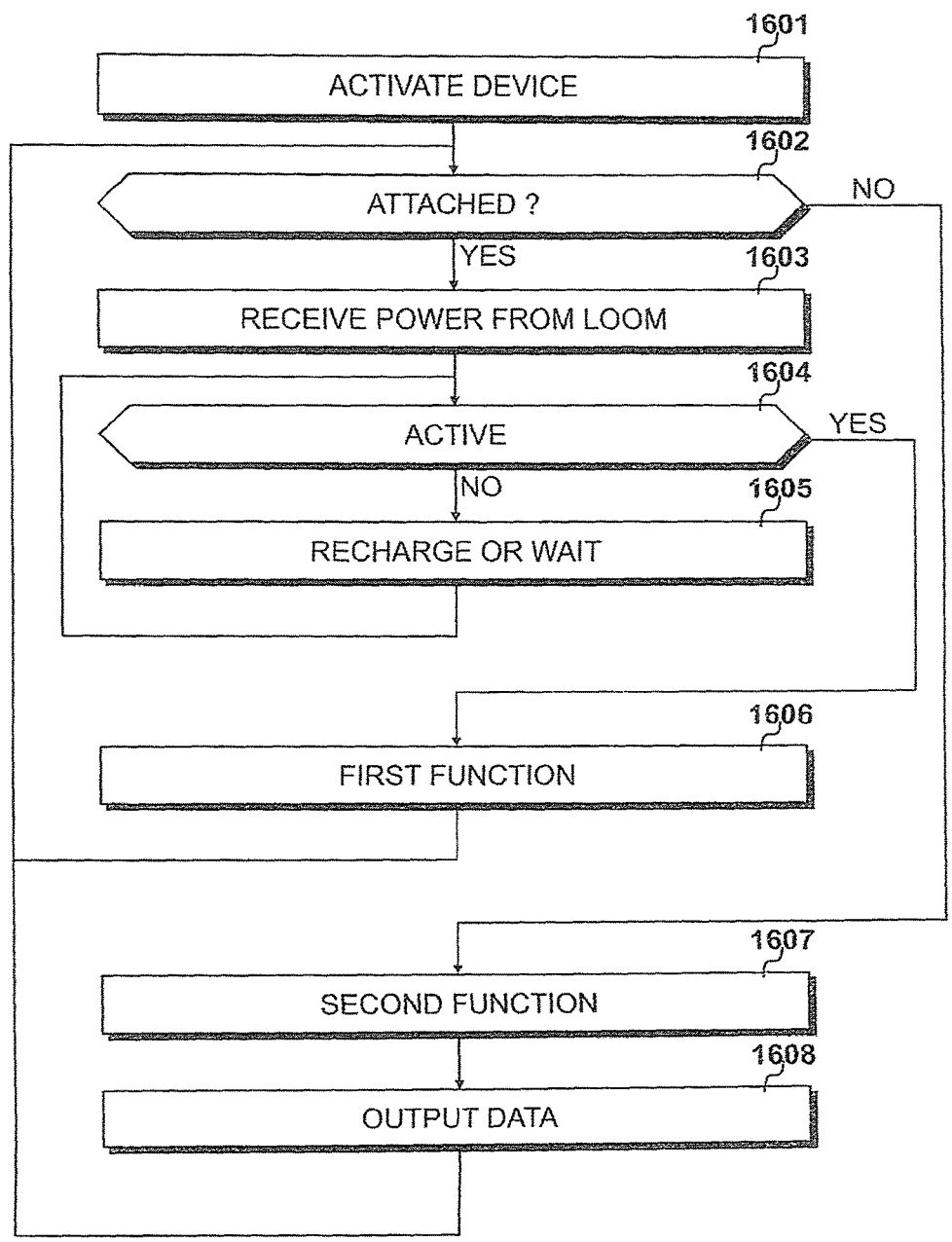
FIG. 16 shows operations performed by a peripheral device.

Operations performed by a peripheral device when deployed are illustrated in FIG. 16.

At step 1601, the device is activated, which may include the activation of a locally positioned switch for example. At step 1602 a question is asked as to whether the device is attached to a jacket and if answered in the affirmative, the device will attempt to receive power from the loom at step 1603.

At step 1604, a question is asked as to whether the device is active, in that a request for data has been made, possibly via the control unit 106 in response to a command from the external communication device 108. If this question is answered in the negative, the peripheral device continues to wait for an activate command and continues to recharge its internal power source from the remote supply.

Upon receiving a command to become active, the question asked at step 1604 will be answered in the affirmative, resulting in the peripheral device providing its first functionality at step 1606. While providing this first functionality (the generation of image data or the generation of illumination for example) power demand is modest and power continues to be received from remote cell 602 via the loom 601. If data is being generated, this may be supplied directly to the external communication device or it may be relayed to the external communication device via the control unit.

Upon detachment of the peripheral device 107, an interrupt signal is sent to internal processor 1202, effectively resulting in the question asked at step 1602 being answered in the negative. Consequently, at step 1607 the second functionality is supplied and, where appropriate, new output data is generated at step 1608.

In response to providing a second functionality, the peripheral device 107 receives power from its own internal power source 1208. Furthermore, upon the generation of output data, this data is conveyed to the external communication device 108 via a direct Wi-Fi wireless connection.

It can therefore be seen that an embodiment provides an environment in which a wired data connection may be made between the peripheral device 107 and the control unit 106. A first wireless connection is established between the control unit and an external communication device 108. Configuration data is relayed between the external communication device and the peripheral device, via the first wireless connection, the control unit and the wired data connection. This enables a second wireless connection to be made directly between the external communication device and the peripheral device.

When the peripheral device is attached to an item of clothing, it receives power from the power supply contained within the control unit to provide a first functionality. First operational output data is generated, which is conveyed over the wired connection to the control unit. However, upon detachment of the peripheral device from the item of clothing, the peripheral device detects that a detachment has been made. It then receives power from the second local power source to provide a second functionality, which supplies new operational data to the external communication device directly over the second wireless connection.

The invention claimed is:

1. An apparatus comprising an item of clothing and a peripheral device wherein:
   said item of clothing comprises:
      a peripheral device connector,
      a first power source and
      conductors for supplying electrical power from said first power source to said peripheral device connector; and
   said peripheral device comprises:
      a clothing connector and
      a second power source, such that said clothing connector is connectable to said peripheral device connector;
   wherein:
      when said clothing connector is connected to said peripheral device connector, said peripheral device is configured to provide a first functionality and charge said second power source from said first power source; and
      upon detecting detachment of said clothing connector from said peripheral device connector, said peripheral device is configured to provide a second functionality by receiving power from said second power source;
   wherein:
      said peripheral device is a light emitting apparatus;
      said light emitting apparatus provides a first functionality of generating a warning light at a first intensity; and
      said light emitting apparatus provides a second functionality of generating an illuminating light at a second intensity, wherein said second intensity is higher than said first intensity.

2. The apparatus claim 1, wherein said peripheral device is configured to activate said second functionality upon detecting detachment from said item of clothing.

3. The apparatus of claim 1, wherein:
   said light emitting apparatus includes a plurality of light emitting devices;
   a first set of said light emitting devices are activated to provide said first intensity; and
   a second set of said light emitting devices are activated to provide said second intensity.

4. The apparatus of claim 3, wherein said second set of light emitting devices includes lenses that collectively provide a focused beam of said second intensity.

5. The apparatus of claim 1, further comprising a switching device for switching to said second power source upon detection of the removal of said first power source.

6. The apparatus of claim 5, wherein functionality of said peripheral device changes after a detection of a removal of said peripheral device from said item of clothing.

7. The apparatus of claim 1, wherein:
   said peripheral device uses power from said first power source when operating at a first power level;
   said peripheral device uses power from said second power source when operating at a second power level; and
   said second power level is higher than said first power level.

8. The apparatus of claim 7, wherein said peripheral device remains attached to the item of clothing when operated at said second power level.

9. A method of providing electrical power for operating a peripheral device which is a light emitting apparatus, comprising the steps of:
   attaching said peripheral device to an item of clothing, wherein
      said item of clothing includes:
         a peripheral device connector,
         a first power source and
         conductors for supplying electrical power from said first power source to said peripheral device connector; and
      said peripheral device comprises:
         a clothing connector and
         a second power source, such that said clothing connector is connectable to said peripheral device connector;
   operating said light emitting apparatus to provide a first functionality of generating a warning light at a first intensity when said clothing connector is attached to said peripheral device connector of said item of clothing;
   charging said second power source from said first power source when said clothing connector is attached to said peripheral device connector of said item of clothing; and
   configuring said light emitting apparatus to provide a second functionality of generating an illuminating light at a second intensity, wherein said second intensity is higher than said first intensity, by receiving power from said second power source upon detecting detachment of said clothing connector from said peripheral device connector.

10. The method of claim 9, further comprising the steps of:
   providing power from a control unit to the peripheral device, via conductors constrained within the item of clothing;
   wherein said conductors are connected to the control unit; and
   wherein said control unit includes said first power source.

* * * * *